United States Patent Office.

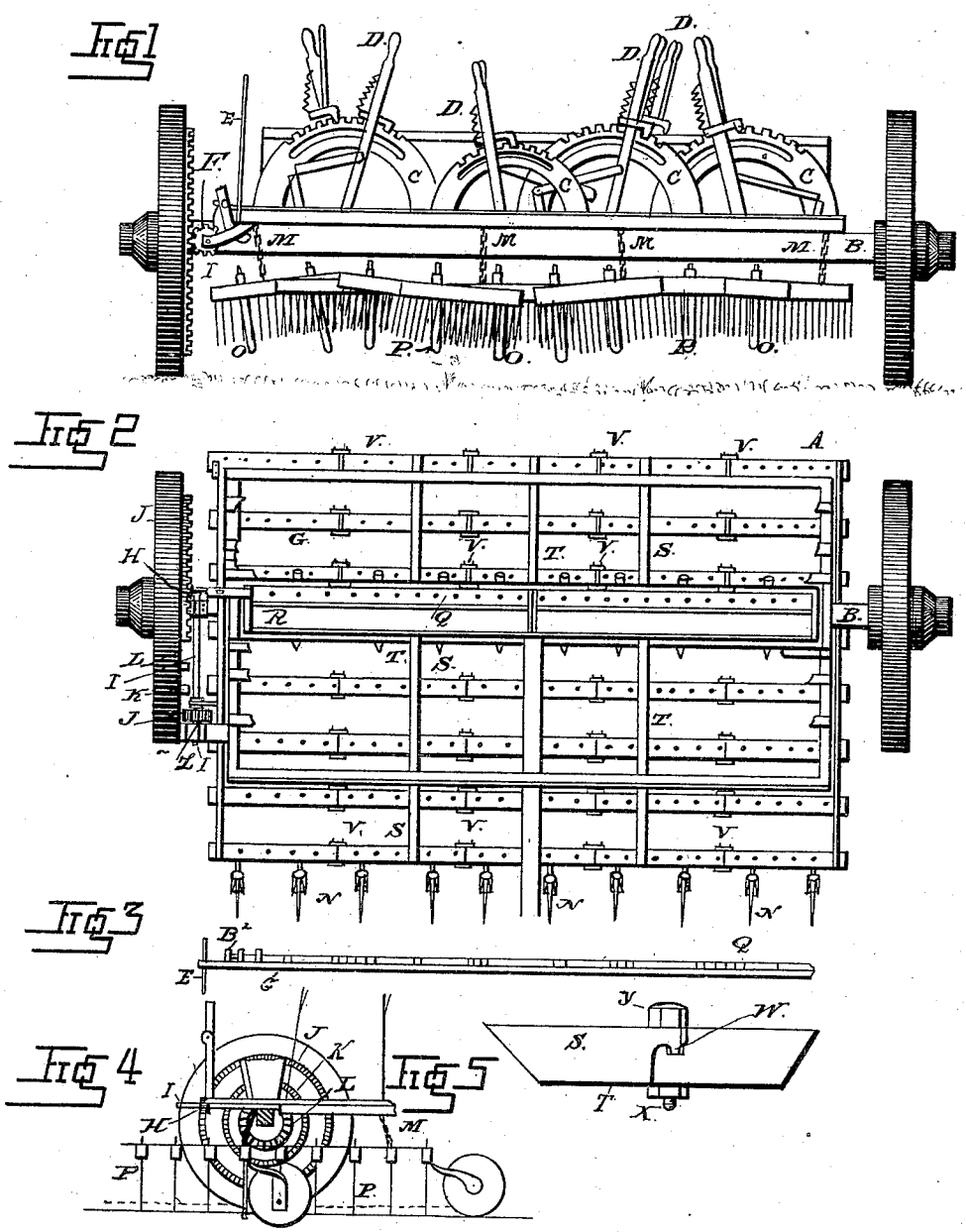

DE WITTE CLINTON, OF LEMOORE, CALIFORNIA.

COMBINED SEEDER AND HARROW.

SPECIFICATION forming part of Letters Patent No. 286,262, dated October 9, 1883.

Application filed April 25, 1882. (No model.)

*To all whom it may concern:*

Be it known that I, DE WITTE CLINTON, a citizen of the United States, residing at Lemoore, in the county of Tulare and State of California, have invented certain new and useful Improvements in Combined Seeders and Harrows, of which the following is a specification, reference being had to the annexed drawings and the letters marked thereon.

My invention relates to that class of combined seeders and harrows where the harrows and seeders are suspended from a portable frame which is carried upon wheels.

Figure 1 represents a front elevation; Fig. 2, a plan view, showing part of the frame broken out; Fig. 3, a side elevation on a reduced scale; Fig. 4, a view of the slide which regulates the feed to the drill-teeth; Fig. 5, a view of a segment of the connecting-bars for the harrow-sections.

A represents the main frame of the machine; B, the axle; C, the quadrants and lever-ratchets; D, the hand-levers for raising and adjusting the seeding drills and harrows; E, the hand-lever for shifting the gear that operates the feed-slide for the seed-drills; F, the elbow connecting-lever connecting with the slide G. G is the adjustable seed-slide; H, the crank; I, the shaft; J the outer, K the intermediate, and L the inner, cog-rim. M represents the chains that suspend the harrows and seed-drills; N, the rolling cutters; O, the drill-teeth, with flexible connecting-pipes leading from the drill-box; P, the harrow-teeth; Q, the openings or seed-spaces in the slides, which gage the amount of seed sown; R, the seed-box; S, the straps or bars that connect the harrows. S² are the sections of the harrow; T, the joints connecting the sections of the harrows, and V the links connecting the ends of the harrow-sections.

The following is the construction of the same: I construct the sections of the harrows and drills of about the same length in the same machines. I vary the length from eighteen inches to two feet for different-sized harrows. I use wood or any other suitable material for the harrow-frames. I construct the drill-teeth about in the usual form of well-known construction and vary the forward or cutting edge to suit the soil and cause them to cut their way and clear well. I connect them with the seed-box by means of any suitable flexible tube or conducting-pipe, to convey the seed from the box or seed-hopper to the drill-teeth. I construct the harrow-teeth by any well-known methods and of any suitable metals. I place the rolling cutters N, as shown, one in front of each drill-tooth and about one foot apart in front of the harrows.

The following is the operation of the same: By adjusting the levers D upon the quadrants C, the harrows and drills are raised or lowered to the required height to adapt them to the work required. The joints T and link-connections V render the whole harrow and drill combination flexible and allow a perfect adaptation to the surface of the ground. The joint T is a lock-joint, and has the nib or stop W, and is locked by the nut and screw X and Y, while the lock-joint T renders the harrow sufficiently flexible. The nib W, serving as a stop, does not allow the harrow-sections to fold over upon each other or vibrate farther than required; but the whole construction of harrow or seed-drill accommodates and conforms to the surface of the ground. The shifting-pinion Z operates upon the feathered shaft I, and may be slid into gear with either of the cog-rims J, K, or L. When in gear with the outer rim, J, it has its greatest speed, and is adapted to sowing grain or other small seed. When in gear with the intermediate rim, K, it is about right for dropping beans or peas or seeds of that class, and when in gear with the inner rim the speed is about right for dropping corn four feet apart each way. This is effected by means of feathered shaft I, which operates the slide G by means of the crank H, which imparts motion to the slide by means of a slotted connecting-lever, F, or by any well-known lever-connection.

The slide G may be adjusted to open or close the seed-chambers and regulate and adapt the same to the amount and kind of seed to be dropped by means of the set-screws B².

By my construction and arrangement I have accomplished a perfectly-adjustable machine and combined three different classes of seeding-machines in one by simply shifting the gear upon the master-wheel or main driving-wheel and adjusting the slide G by means of the regulating set-screws $B^2$. The adjustment of the seeding-slide is arranged so that holes that are above each tooth of the drill are uncovered for seeding grain, and those over every alternate tooth are uncovered for seeding beans, peas, and that class of seed, and those over every fourth tooth, or four feet apart, are uncovered for seeding Indian corn four feet apart. This is effected by simply sliding the upper section of the slide so as to uncover the required openings, as shown.

Having thus described my invention, what I claim is—

The combination, with the harrow-sections $S^2$, of the straps S, links V, and joints T, provided with stops W, bolts Y, and nuts X, all arranged in the manner and for the purposes set forth.

DE WITTE CLINTON.

Witnesses:
JOHN H. REDSTONE,
FRANK R. BRAUN.